March 29, 1938.  O. W. NOTTINGHAM  2,112,785
MECHANICAL BRAKE EQUALIZER
Filed Jan. 25, 1937

Oria W. Nottingham,
INVENTOR
BY Victor J. Evans & Co.
ATTORNEYS

WITNESS

Patented Mar. 29, 1938

2,112,785

UNITED STATES PATENT OFFICE 2,112,785

MECHANICAL BRAKE EQUALIZER

Oria W. Nottingham, Shonkin, Mont.

Application January 25, 1937, Serial No. 122,279

3 Claims. (Cl. 188—204)

This invention relates to mechanical brake equalizers especially adapted for four wheel brakes of motor vehicles and has for the primary object the provision of a device of this character which will be simple and efficient and which will assure each brake receiving equal brake applying force for the application of the brakes.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a plan view, partly in section, showing my invention connected with brakes of a motor vehicle.

Figure 1:
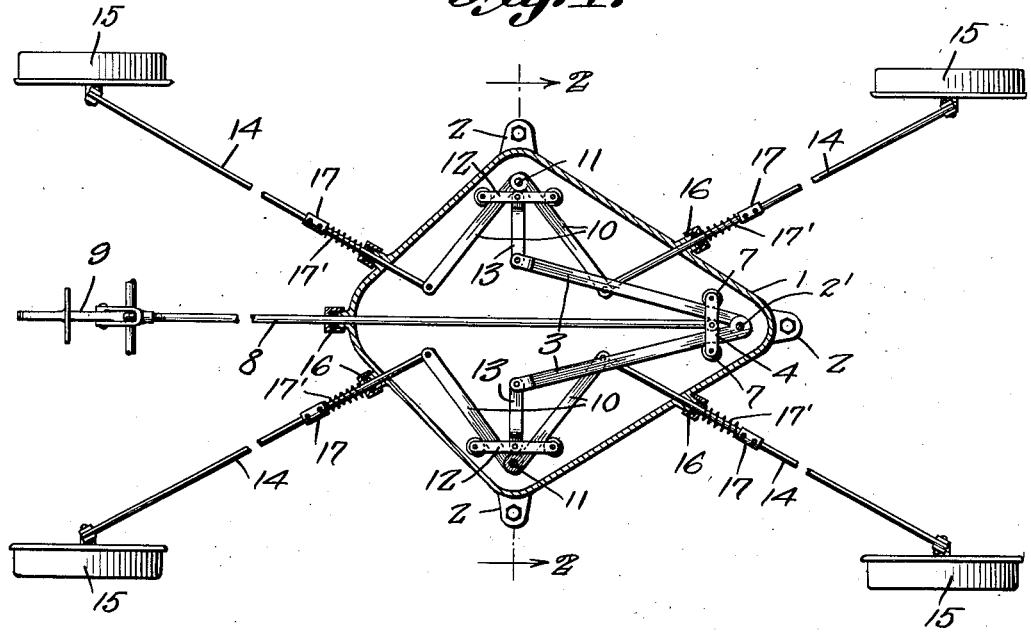
Figure 2:
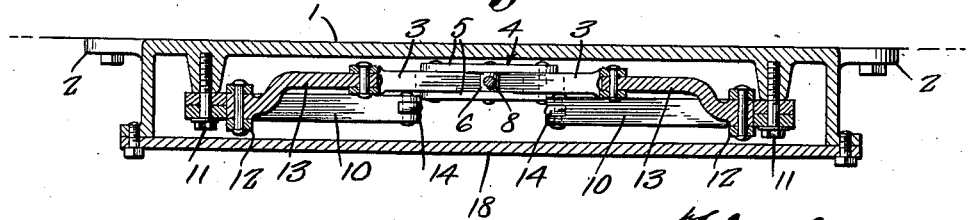
Figure 2 is a sectional view taken on the line 2—2 of Figure 1.
Figure 3:
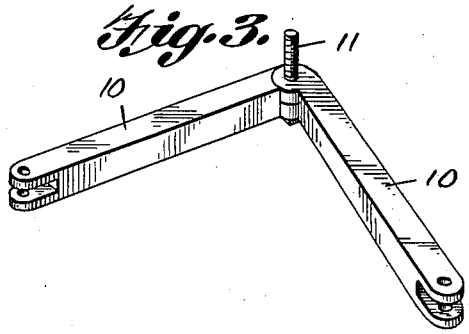
Figure 3 is a perspective view illustrating the master levers of the device.
Figure 4:
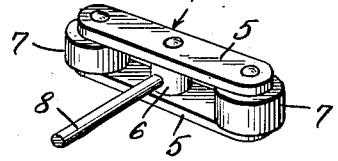
Figure 4 is a perspective view illustrating a head to engage with the master levers.

Referring in detail to the drawing, the numeral 1 indicates a casing equipped with attaching ears 2 employed for receiving fasteners so that said casing may be firmly attached to a motor vehicle. A pair of master levers 3 are pivotally mounted in the casing 1 adjacent one end thereof and are arranged in diverging relation. The pivot for the master levers is indicated at 2'. A head 4 consisting of spaced plates 5, a spacer 6 and rollers 7 is secured to one end of an operating rod 8. The operating rod is slidably supported by the casing and is connected to a brake pedal or similar device 9. The master levers 3 pass between the rollers 7 and the spacer 6 so that said rollers engage the outer sides of the master levers whereby the movement of the head by the brake pedal will cause the master levers to move in the direction of each other.

Pairs of auxiliary levers 10 are pivotally mounted in the casing, as shown at 11, and said auxiliary levers of each pair are arranged in diverging relation and are engaged by a head 12. The heads 12 are constructed similar to the head 4 and have pivoted thereto links 13 which are in turn pivoted to the free ends of the master levers 3. Rods 14 are pivoted to the free ends of the auxiliary levers 10 and are slidably supported by the casing 1. The rods 14 are connected to brakes 15 of a motor vehicle (not shown). The casing is provided with stuffing boxes 16 to slidably support the rods 14 and the operating rod 8.

The foot pedal 9 when depressed draws the head 4 away from the pivot 2' of the master levers bringing about movement of the master levers in the direction of each other. The master levers moving in the direction of each other bring about movement of the auxiliary levers of each pair in the direction of each other exerting equal pull on the rods 14 and consequently bringing about an equal application of the brakes 15.

Stops 17 are secured to the rods 14. Should one of the brakes become defective or have too much slack, the stop of that brake will move into engagement with the casing 1 during the depressing of the foot pedal and thereby prevent unequal application of the brakes.

The casing 1 has a removable cover 18. The casing prevents dirt and other foreign matter from interfering with the parts operating within the casing and will permit the parts to be thoroughly lubricated by the placing of lubricant within the casing.

Coil springs 17' are mounted on the rods 14 between the packing glands 16 and the stops 17 for the purpose of releasing the brakes when pressure thereon is relieved.

What is claimed is:

1. A mechanical brake equalizer comprising a casing, master levers pivotally mounted in the casing and to each other for movement towards and from each other, a head engaging said levers, auxiliary levers pivotally mounted to the casing and arranged in pairs and pivoted to each other, heads pivoted to the master levers and engaging the auxiliary levers, and brake rods connecting the auxiliary levers to brakes.

2. A mechanical brake equalizer comprising a casing, brake rods extending into said casing and slidably supported by the latter and connected to brakes, pivotally connected master levers pivotally mounted in the casing, pairs of pivotally connected auxiliary levers pivotally mounted in said casing, a head slidably engaging the master levers, an operating rod connected to said head and to a brake pedal, heads slidably engaging the pairs of auxiliary levers, and links pivotally connected to the last-named heads and to the master levers.

3. A mechanical brake equalizer comprising master and auxiliary levers grouped in pairs, a pivot connecting the master levers, pivots connecting the auxiliary levers, brake operating means slidably connected to said master levers, means pivotally and slidably connecting the master levers to the auxiliary levers, and means connecting the auxiliary levers to brakes.

ORIA W. NOTTINGHAM.